United States Patent
Lee et al.

(10) Patent No.: US 12,309,774 B2
(45) Date of Patent: May 20, 2025

(54) METHOD AND APPARATUS FOR TRANSMITTING AND RECEIVING DATA BASED ON A HIGHER LAYER PARAMETER ASSOCIATED WITH A PUCCH IN WIRELESS COMMUNICATION SYSTEM

(71) Applicant: SAMSUNG ELECTRONICS CO., LTD., Suwon-si (KR)

(72) Inventors: Kyunggyu Lee, Suwon-si (KR); Sungjin Park, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 17/664,827

(22) Filed: May 24, 2022

(65) Prior Publication Data

US 2022/0386343 A1    Dec. 1, 2022

(30) Foreign Application Priority Data

May 24, 2021    (KR) .......................... 10-2021-0066494

(51) Int. Cl.
 *H04W 72/12* (2023.01)
 *H04L 1/1812* (2023.01)
 (Continued)

(52) U.S. Cl.
 CPC ....... *H04W 72/1273* (2013.01); *H04L 1/1812* (2013.01); *H04L 5/0053* (2013.01);
 (Continued)

(58) Field of Classification Search
 CPC ......... H04W 72/1273; H04W 72/0446; H04W 72/23; H04W 76/30; H04W 16/14;
 (Continued)

(56) References Cited

U.S. PATENT DOCUMENTS 11,297,640 B2    4/2022    Oh et al.
2018/0124815 A1*   5/2018  Papasakellariou ..........................
                                                H04W 72/0446
(Continued)

FOREIGN PATENT DOCUMENTS

CN          112637958 A       4/2021
KR     10-2020-0034559 A      3/2020

OTHER PUBLICATIONS

International Search Report and Written Opinion of the International Searching Authority dated Aug. 23, 2022, in connection with International Application No. PCT/KR2022/007341, 9 pages.
ZTE, "Discussion on HARQ-ACK enhancements for eURLLC," 3GPP TSG RAN WG1 Meeting #104b-e, R1-2102493, 21 pages, Apr. 12-20, 2021.
Ericsson, "Feature lead summary#4 on timing relationship enhancements," 3GPP TSG-RAN WG1 Meeting #104-e, R1-2102078, 85 pages, Jan. 25-Feb. 5, 2021.
(Continued)

*Primary Examiner* — Kiet Tang

(57) ABSTRACT

A method of a user equipment (UE) in a wireless communication system, includes receiving a downlink channel from a base station; identifying a reference slot associated with physical uplink control channel (PUCCH) transmission, wherein the identifying of the reference slot comprises, in case that a higher layer parameter configuring a sub-slot for a PUCCH is received, identifying that the reference slot is the last uplink slot for PUCCH transmission that overlaps with the downlink channel, and in case that the higher layer parameter is not received, identifying that the reference slot is the last uplink slot for PUCCH transmission that overlaps with a downlink slot for the downlink channel reception; and transmitting, to the base station, a PUCCH including hybrid automatic repeat request acknowledgment (HARQ-ACK) information corresponding to the downlink channel based on the reference slot.

16 Claims, 13 Drawing Sheets

(51) Int. Cl.
  *H04L 5/00*      (2006.01)
  *H04W 72/0446*   (2023.01)
  *H04W 72/1273*   (2023.01)
  *H04W 72/23*     (2023.01)
  *H04W 76/30*     (2018.01)

(52) U.S. Cl.
  CPC ....... *H04W 72/0446* (2013.01); *H04W 72/23* (2023.01); *H04W 76/30* (2018.02)

(58) Field of Classification Search
  CPC ... H04L 1/1812; H04L 5/0053; H04L 1/1864; H04L 1/1861; H04L 1/1854; H04L 1/0018; H04L 1/1896; H04L 5/0055
  See application file for complete search history.

(56) References Cited

U.S. PATENT DOCUMENTS

2019/0222394 A1* 7/2019 Medles ................. H04L 5/0055
2020/0100276 A1* 3/2020 Oh ........................ H04W 16/14

OTHER PUBLICATIONS

CATT, "Remaining issues on UCI enhancements," 3GPP TSG RAN WG1 #102-e, R1-2005673, 12 pages, Aug. 17-28, 2020.
LG Electronics, "Summary #2 of PDSCH/PUSCH enhancements (Scheduling/HARQ)," 3GPP TSG RAN WG1 #104-e, R1-2101858, 30 pages, Jan. 25-Feb. 5, 2021.
Supplementary European Search Report dated Sep. 30, 2024, in connection with European Patent Application No. 22811605.9, 8 pages.

* cited by examiner

METHOD AND APPARATUS FOR TRANSMITTING AND RECEIVING DATA BASED ON A HIGHER LAYER PARAMETER ASSOCIATED WITH A PUCCH IN WIRELESS COMMUNICATION SYSTEM

CROSS-REFERENCE TO RELATED APPLICATION

This application is based on and claims priority under 35 U.S.C. § 119 to Korean Patent Application No. 10-2021-0066494, filed on May 24, 2021, in the Korean Intellectual Property Office, the disclosure of which is incorporated by reference herein in its entirety.

BACKGROUND

1. Field

The disclosure relates to a wireless communication system, and more particularly, to a method and apparatus for transmitting and receiving data in a wireless communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure relates to a method and apparatus for transmitting and receiving, by a user equipment (UE), data in a wireless communication system, and more particularly, to a method and apparatus for transmitting hybrid automatic repeat request-acknowledgement (HARQ-ACK) feedback for downlink data transmission.

Additional aspects will be set forth in part in the description which follows and, in part, will be apparent from the description, or may be learned by practice of the presented embodiments of the disclosure.

According to an embodiment of the disclosure, a method of a user equipment (UE) in a wireless communication system, includes: receiving a downlink channel from a base station; identifying a reference slot associated with physical uplink control channel (PUCCH) transmission, wherein the identifying of the reference slot comprises, in case that a higher layer parameter configuring a sub-slot for a PUCCH is received, identifying that the reference slot is the last uplink slot for PUCCH transmission that overlaps with the downlink channel, and in case that the higher layer parameter is not received, identifying that the reference slot is the last uplink slot for PUCCH transmission that overlaps with a downlink slot for the downlink channel reception; and transmitting, to the base station, a PUCCH including hybrid automatic repeat request acknowledgment (HARQ-ACK) information corresponding to the downlink channel based on the reference slot.

According to another embodiment of the disclosure, a method of a base station in a wireless communication system, includes: transmitting a downlink channel to a user equipment (UE); and receiving, in an uplink slot identified based on a reference slot associated with PUCCH transmission, a physical uplink control channel (PUCCH) including hybrid automatic repeat request acknowledgement (HARQ-ACK) information corresponding to the downlink channel, wherein in case that a higher layer parameter configuring a sub-slot for a PUCCH is transmitted to the UE from the base station, the reference slot is the last uplink slot for PUCCH transmission that overlaps with the downlink channel, and wherein in case that the higher layer parameter is not transmitted to the UE from the base station, the reference slot is the last uplink slot for PUCCH transmission that overlaps with a downlink slot for the downlink channel reception.

According to another embodiment of the disclosure, a user equipment (UE) in a wireless communication system, includes: a transceiver; and at least one processor configured to: receive a downlink channel from a base station; identify a reference slot associated with physical uplink control channel (PUCCH) transmission, wherein the at least one processor is further configured to, in case that a higher layer parameter configuring a sub-slot for a PUCCH is received, identify that the reference slot is the last uplink slot for PUCCH transmission that overlaps with the downlink channel, and in case that the higher layer parameter is not received, identify that the reference slot is the last uplink slot for PUCCH transmission that overlaps with a downlink slot for the downlink channel reception; and transmit, to the base station, a PUCCH including hybrid automatic repeat request acknowledgment (HARQ-ACK) information corresponding to the downlink channel based on the reference slot.

According to another embodiment of the disclosure, a base station in a wireless communication system, includes: a transceiver; and at least one processor configured to: transmit a downlink channel to a user equipment (UE); and receive, in an uplink slot identified based on a reference slot associated with PUCCH transmission, a physical uplink control channel (PUCCH) including hybrid automatic repeat request acknowledgement (HARQ-ACK) information corresponding to the downlink channel, wherein in case that a higher layer parameter configuring a sub-slot for a PUCCH is transmitted to the UE from the base station, the reference slot is the last uplink slot for PUCCH transmission that overlaps with the downlink channel, and wherein in case that the higher layer parameter is not transmitted to the UE from the base station, the reference slot is the last uplink slot for PUCCH transmission that overlaps with a downlink slot for the downlink channel reception.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
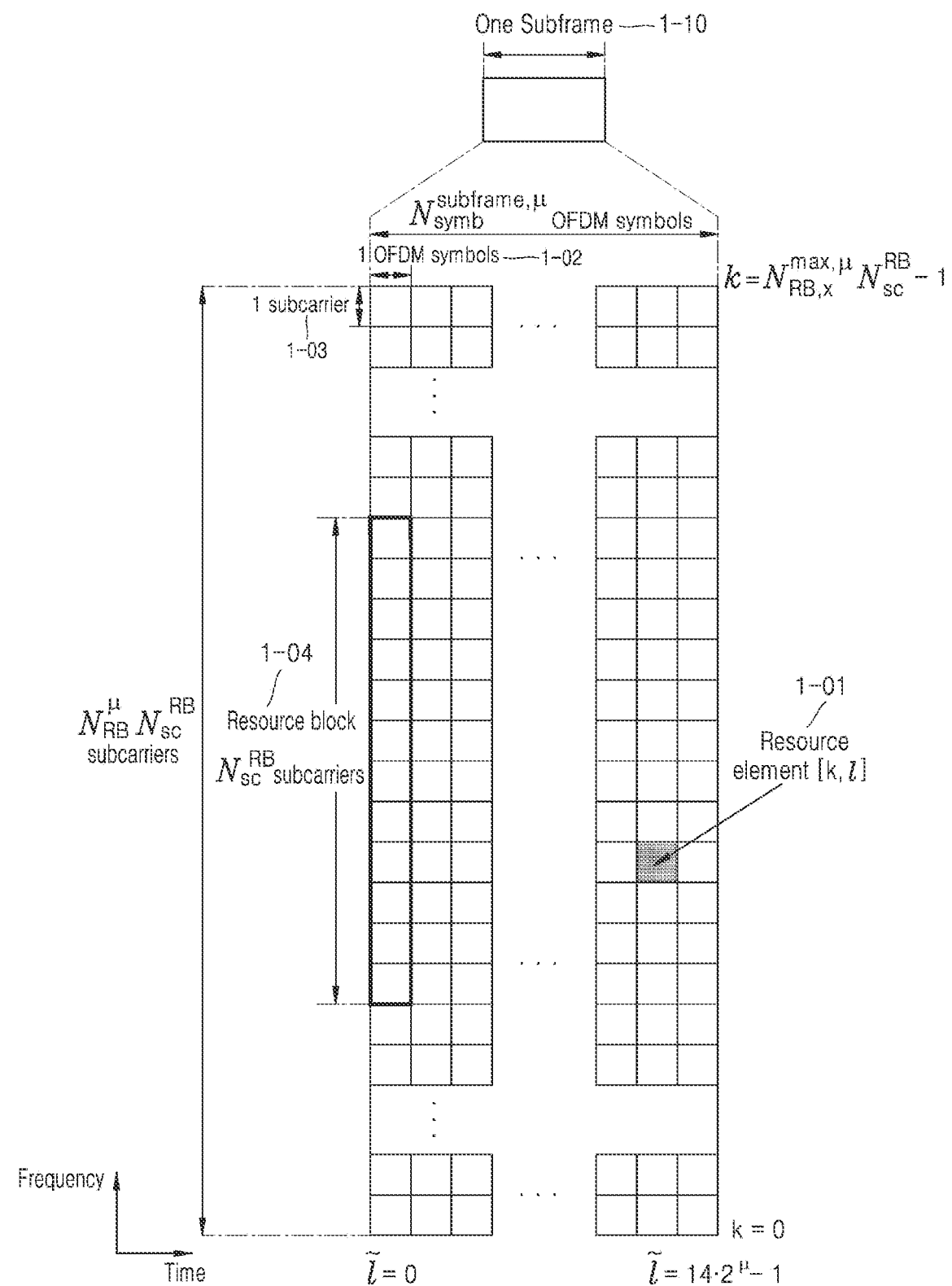
FIG. 1 illustrates a diagram of a time-frequency domain transmission structure of LTE, E-UTRA, LTE-A, NR, or a similar wireless communication system according to an embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described with reference to accompanying drawings.

In describing the embodiments of the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Advantages and features of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, according to some embodiments of the disclosure, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units." Furthermore, the components and "units" may be embodied to reproduce one or more central processing units (CPUs) in a device or security multimedia card. Also, in some embodiments of the disclosure, the "unit" may include at least one processor.

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification. Hereinafter, a base station is an entity that allocates resources to a terminal, and may be at least one of a gNode B (gNB), an eNode B (eNB), a Node B (NB), a wireless access unit, a BS controller, or a node on a network. Examples of a terminal may include user equipment (UE), a mobile station (MS), a cellular phone, a smartphone, a computer, and a multimedia system capable of performing a communication function. The disclosure is not limited to the above examples. Hereinafter, a technique for a terminal to receive broadcast information from a base station in a wireless communication system will be described. The disclosure relates to a communication technique and system for converging a $5^{th}$ generation (5G) communication system for supporting a higher data rate than a beyond $4^{th}$ generation (4G) system with an Internet of Things (IoT) technology. The disclosure may be applied to intelligent services (e.g., smart homes, smart buildings, smart cities, smart cars or connected cars, health care, digital education, retail business, and security and safety related services) based on 5G communication technology and IoT related technology.

Hereinbelow, terms indicating broadcast information, terms indicating control information, terms related to communication coverage, terms indicating a change in a state (for example, an event), terms indicating network entities, terms indicating messages, and terms indicating components of an apparatus are exemplified for convenience of description. Thus, the terms used in the disclosure are not limited and other terms having the same technical meanings may be used.

Hereinafter, for convenience of descriptions, some of terms and names defined by the 3rd Generation Partnership Project Long Term Evolution (3GPP LTE) standard may be used. However, the disclosure is not limited by such terms and names, and may be equally applied to systems conforming to other standards.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a user equipment (UE) or a mobile station (MS)) transmits data or a control signal to a base station (BS) (e.g., eNode B), and the DL refers to a radio link through which a BS transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system after the LTE system, that is, a 5G communication system, has to be able to freely reflect various requirements of a user and a service provider, and thus, services satisfying various requirements need to be supported. The services considered for the 5G communication system include enhanced mobile broadband (eMBB), massive machine type communication (mMTC), ultra reliability low latency communication (hereinafter, URLLC), etc.

According to some embodiments of the disclosure, the eMBB aims to provide a higher data rate than a data rate supported by the LTE, LTE-A, or LTE-Pro system. For example, in the 5G communication system, the eMBB should be able to provide a peak data rate of 20 Gbps in the DL and a peak data rate of 10 Gbps in the UL from the viewpoint of one BS. At the same time, the eMBB should provide an increased user perceived data rate. In order to satisfy such requirements, improvement of various transmitting/receiving technologies including a further improved multiple-input and multiple-output (MIMO) transmission technology may be demanded. Also, the eMBB may satisfy a data rate required in the 5G communication system by using a frequency bandwidth wider than 20 MHz in a frequency band of 3 to 6 GHz or equal to or greater than 6 GHz instead of 2 GHz used by current LTE.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal may require a wider coverage than other services provided by the 5G communication system. The terminals that support the mMTC should be configured as inexpensive terminals and require very long battery lifetime because it is difficult to frequently replace batteries of the terminals.

Finally, the URLLC that is a cellular-based wireless communication service used for mission-critical purposes needs to provide communication providing ultra-low latency and ultra-high reliability as a service used in remote control for robots or machinery, industrial automation, unmanaged aerial vehicles, remote health care, or emergency alert. For example, a service supporting the URLLC should satisfy air interface latency smaller than 0.5 milliseconds and at the same time, requires a packet error rate of $10^{-5}$ or less. Accordingly, for the service supporting the URLLC, the 5G communication system is required to provide a transmit time interval (TTI) shorter than those for other services while allocating a broad resource in a frequency band. However, the mMTC, URLLC, and eMBB are examples of different service types, and service types to which the disclosure is applied are not limited thereto.

The services considered in the 5G communication system described above may be converted with each other and provided based on one framework. In other words, for efficient resource management and control, services may be integrated, controlled, and transmitted via one system instead of being independently operated.

Also, hereinbelow, one or more embodiments of the disclosure will be described as an example of a long-term evolution (LTE), LTE-advanced (LTE-A), LTE Pro, or new radio (NR) system, but the one or more embodiments of the disclosure may also be applied to other communication systems having a similar technical background or channel form. Also, it will be understood by one of ordinary skill in the art that embodiments of the disclosure may be applied to other communication systems through some modifications without departing from the scope of the disclosure.

<5G System Frame Structure>

Hereinafter, a frame structure of a 5G system will be described in detail with reference to accompanying drawings.

FIG. 1 illustrates a diagram of a basic structure of a time-frequency resource in a wireless communication system according to an embodiment of the present disclosure.

Referring to FIG. 1, a horizontal axis represents a time domain and a vertical axis represents a frequency domain. In the time and frequency domains, a base unit of a resource is a resource element (RE) 1-01, and may be defined by one OFDM symbol 1-02 on a time axis and one subcarrier 1-03 on a frequency axis. In the frequency domain, $N_{sc}^{RB}$ (for example, 12) consecutive REs 1-01 may configure one resource block (RB) 1-04. According to an embodiment of the disclosure, a plurality of OFDM symbols 1-02 may configure one subframe 1-10.

Figure 2:
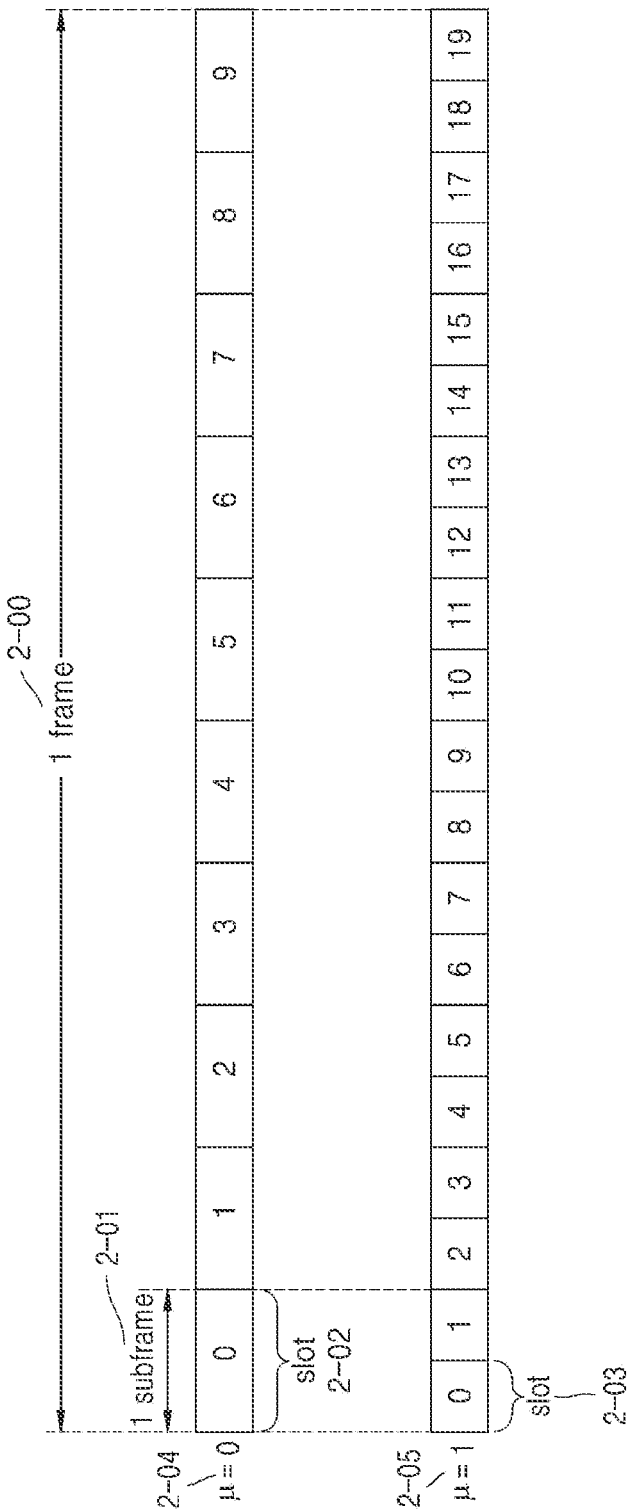
FIG. 2 illustrates a diagram of structures of a frame, a subframe, and a slot in $5^{th}$ generation (5G) according to an embodiment of the present disclosure.

FIG. 2 illustrates a diagram for describing structures of a frame 2-00, subframe 2-01, and a slot 2-02, in a wireless communication system according to an embodiment of the present disclosure.

Referring to FIG. 2, one frame 2-00 may include one or more subframes 2-01, and one subframe 2-01 may include one or more slots 2-02. For example, one frame 2-00 may be defined to be 10 ms. One subframe 2-01 may be defined to be 1 ms, and in this case, one frame 2-00 may include total 10 subframes 2-01. One slot 2-02 or 2-03 may be defined by 14 OFDM symbols (i.e., the number ($N_{symb}^{slot}$) of symbols per slot=14). One subframe 2-01 may include one slot 2-02 or the plurality of slots 2-03, and the number of slots 2-02 or 2-03 per subframe 2-01 may depend on configuration values μ 2-04 or 2-05 for subcarrier spacing. FIG. 2 illustrates cases where the μ 2-04 is 0 and the μ 2-05 is 1, as the configuration values for subcarrier spacing. When the μ 2-04 is 0, one subframe 2-01 may include one slot 2-02, and when the μ 2-05 is 1, one subframe 2-01 may include two slots 2-03. In other words, the number ($N_{slot}^{subframe,\mu}$) of slots per subframe may vary depending on a configuration value μ for subcarrier spacing, and accordingly, the number ($N_{slot}^{frame,\mu}$) of slots per frame may vary. $N_{slot}^{subframe,\mu}$ and $N_{slot}^{frame,\mu}$ according to the configuration value μ for each subcarrier spacing may be defined as Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In an NR system, one component carrier (CC) or serving cell may be configured of 250 or more RBs. Accordingly, when a UE always receives an entire serving cell bandwidth as in an LTE system, power consumption of the UE may be severe, and to solve this, a base station may configure the UE with one or more bandwidth parts (BWPs) to support the UE to change a reception area in a cell. In the NR system, the base station may configure an "initial BWP" that is a bandwidth of a control resource set (CORESET) #0 (or common search space (CSS)) for the UE through a master information block (MIB). Then, the base station may configure the initial BWP of the UE through radio resource control (RRC) signaling, and notify at least one piece of BWP configuration information that may be indicated through downlink control information (DCI) later. Next, the base station may notify about a BWP identification (ID) through the DCI to indicate to the UE which band to use. When the UE does not receive the DCI from a currently allocated BWP for a specific period of time, the UE may return to a "default BWP" and try to receive the DCI.

<5G BWP>

Figure 3:
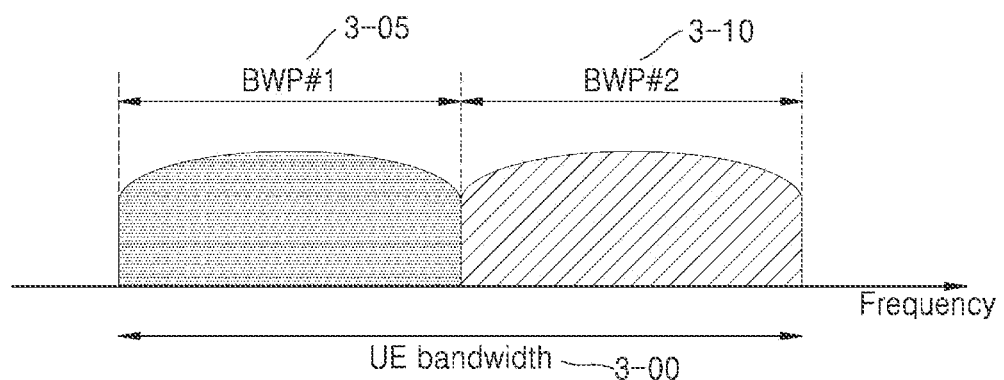
FIG. 3 illustrates an example of a configuration of a BWP in a wireless communication system according to an embodiment of the present disclosure.

FIG. 3 illustrates an example of a configuration of a BWP in a wireless communication system according to an embodiment of the present disclosure.

Referring to FIG. 3, an example in which a UE bandwidth 3-00 is configured in two BWPs, i.e., a BWP #1 3-05 and a BWP #2 3-10, is illustrated. A base station may configure a UE with one or more BWPs and may configure pieces of information as in Table 2 below for each BWP.

TABLE 2

```
BWP ::=                        SEQUENCE {
    bwp-Id                              BWP-Id,
  (BWP ID)
    locationAndBandwidth    INTEGER (1..65536),
    (BWP Location)
    subcarrierSpacing              ENUMERATED {n0, n1, n2, n3,
  n4, n5},
    (Subcarrier Spacing)
    cyclicPrefix                         ENUMERATED { extended }
    (Cyclic Prefix)
}
```

However, the present disclosure is not limited to the above example, and in addition to the information configured as described above, various parameters related to a BWP may be configured for the UE. The information may be transmitted by the base station to the UE through higher layer signaling, for example, RRC signaling. At least one BWP from among the configured one or more BWPs may be activated. Whether to activate the configured BWP may be transmitted from the base station to the UE semi-statically through RRC signaling or dynamically through a medium access control (MAC) control element (CE) or DCI.

According to an embodiment of the disclosure, the initial BWP for an initial access may be configured for the UE before an RRC connection, by the base station through the MIB. More specifically, the UE may receive configuration information related to a CORESET and a search space, in which a physical downlink control channel (PDCCH) may be transmitted, so as to receive system information (may correspond to remaining system information (RMSI) or system information block 1 (SIB1)) required for the initial access, through an MIB in an initial access stage. The CORESET and search space that are configured through the MIB may be assumed to be identities (IDs) 0, respectively.

The base station may notify the UE of configuration information, such as frequency allocation information, time allocation information, or numerology, for a CORESET #0, through the MIB. Also, the base station may notify the UE of configuration information for a monitoring cycle and occasion for the CORESET #0, i.e., configuration information for a search space #0, through the MIB. The UE may consider a frequency domain configured to be the CORESET #0 obtained from the MIB, as an initial BWP for the initial access. Here, an ID of the initial BWP may be considered to be 0.

A configuration for a BWP supported by a next-generation mobile communication system (the 5G or NR system) may be used for various purposes.

For example, when a bandwidth supported by the UE is smaller than a system bandwidth, the bandwidth supported by the UE may be supported through the configuration for the BWP. For example, by configuring the UE with a frequency location (configuration information 2) of the BWP in Table 2, the UE may transmit or receive data at a specific frequency location in the system bandwidth.

As another example, the base station may configure the UE with a plurality of BWPs for a purpose of supporting different numerologies. For example, to support data transmission/reception using both subcarrier spacing of 15 kHz and subcarrier spacing of 30 kHz for an arbitrary UE, two BWPs may be configured to respectively use the subcarrier spacings of 15 kHz and 30 kHz. Frequency division multiplexing may be performed on the different BWPs, and when data is to be transmitted/received in a specific subcarrier spacing, a BWP configured to have the corresponding subcarrier spacing may be activated.

As another example, the base station may configure the UE with BWPs having different sizes of bandwidths for a purpose of reducing power consumption of the UE. For example, when the UE supports a very large bandwidth, for example, a bandwidth of 100 MHz, and always transmits/receives data through the corresponding bandwidth, very large power consumption may occur. In particular, it is very inefficient in terms of power consumption for the UE to monitor an unnecessary DL control channel for a large bandwidth of 100 MHz in a situation where there is no traffic. Accordingly, the base station may configure the UE with a BWP of a relatively small bandwidth, for example, a BWP of 20 MHz, for a purpose of reducing the power consumption of the UE. In a situation where there is no traffic, the UE may perform a monitoring operation in a BWP of 20 MHz, and when data is generated, the UE may transmit/receive the data by using a BWP of 100 MHz according to an instruction of the base station.

In relation to a method of configuring the BWP, the UEs before RRC connection may receive configuration information regarding the initial BWP through the MIB in the initial access stage. In detail, the UE may be configured with, from an MIB of a physical broadcast channel (PBCH), a CORESET for a downlink control channel through which DCI for scheduling a system information block (SIB) may be transmitted. A bandwidth of the CORESET configured through the MIB may be considered as the initial BWP, and the UE may receive a physical downlink shared channel (PDSCH) through which the SIB is transmitted, through the configured initial BWP. The initial BWP may be used for other system information (OSI), paging, and random access, in addition to the reception of the SIB.

<PDCCH: DCI>

Hereinafter, DCI in a next-generation mobile communication system (5G or NR system) will be described in detail.

In the next-generation mobile communication system (5G or NR system), scheduling information for uplink data (or physical uplink shared channel (PUSCH)) or downlink data (or physical downlink shared channel (PDSCH)) may be transmitted from a base station to a UE through DCI. The UE may monitor a fallback DCI format and a non-fallback DCI format for PUSCH or PDSCH. The fallback DCI format may include a fixed field pre-defined between the base station and the UE, and the non-fallback DCI format may include a configurable field.

The DCI may be transmitted through a physical downlink control channel (PDCCH) through channel coding and modulating processes. Cyclic redundancy check (CRC) may be attached to a DCI message payload, and the CRC may be scrambled to a radio network temporary identifier (RNTI) corresponding to an identity of the UE. Different RNTIs may be used to scramble the CRC attached to the DCI message payload, according to a purpose of a DCI message, for example, UE-specific data transmission, a power control command, or a random access response. In other words, the RNTI is not explicitly transmitted, but may be transmitted by being included in a CRC calculation process. Upon receiving the DCI message transmitted through the PDCCH, the UE may verify the CRC by using an allocated RNTI. When the CRC is verified based on a result of verifying the CRC, the UE may determine that the DCI message is transmitted to the UE.

For example, the DCI scheduling the PDSCH for system information (SI) may be scrambled with an SI-RNTI. The DCI scheduling the PDSCH for a random access response (RAR) message may be scrambled with an RA-RNTI. The DCI scheduling the PDSCH for a paging message may be scrambled with a P-RNTI. The DCI notifying a slot format indicator (SFI) may be scrambled with an SFI-RNTI. The DCI notifying transmit power control (TPC) may be scrambled with a TPC-RNTI. The DCI for scheduling the UE-specific PDSCH or PUSCH may be scrambled with a cell RNTI (C-RNTI).

A DCI format 0_0 may be used as fallback DCI for scheduling the PUSCH and at this time, the CRC may be scrambled with the C-RNTI. According to an embodiment of the disclosure, the DCI format 0_0 in which the CRC is scrambled with the C-RNTI may include information of Table 3 below.

TABLE 3

- Identifier for DCI formats - [1] bit
- Frequency domain resource assignment - [[$\log_2(N_{RB}^{UL,BWP}(N_{RB}^{UL,BWP}+1)/2)$] ] bits
- Time domain resource assignment - X bits
- Frequency hopping flag - 1 bit.

TABLE 3-continued

- Modulation and coding scheme - 5 bits
- New data indicator - 1 bit
- Redundancy version - 2 bits
- HARQ process number - 4 bits
- TPC (transmit power control) command for scheduled PUSCH - [2] bits
- UL/SUL(supplementary UL) indicator - 0 or 1 bit A DCI format 0_1 may be used as non-fallback DCI for scheduling the PUSCH and at this time, the CRC may be scrambled with the C-RNTI. According to an embodiment of the disclosure, the DCI format 0_1 in which the CRC is scrambled with the C-RNTI may include information of Table 4 below.

A DCI format 10 may be used as fallback DCI for scheduling the PDSCH and at this time, the CRC may be scrambled with the C-RNTI. According to an embodiment of the disclosure, the DCI format 1_0 in which the CRC is scrambled with the C-RNTI may include information of Table 5 below.

TABLE 4

- Carrier indicator-0 or 3 bits
- UL/SUL indicator-0 or 1 bit
- Identifier for DCI formats-[1] bits
- Bandwidth part indicator-0, 1 or 2 bits
- Frequency domain resource assignment
    - For resource allocation type 0, $\lceil N_{RB}^{UL,BWP}/P \rceil$ bits
    - For resource allocation type 1, $\lceil \log_2(N_{RB}^{UL,BWP}(N_{RB}^{UL,BWP} +1)/2) \rceil$ bits
- Time domain resource assignment-1, 2, 3, or 4 bits
- VRB(virtual resource block)-to-PRB(physical resource block) mapping-0 or 1 bit, only for resource allocation type 1.
    - 0 bit if only resource allocation type 0 is configured;
    - 1 bit otherwise.
- Frequency hopping flag-0 or 1 bit, only for resource allocation type 1.
    - 0 bit if only resource allocation type 0 is configured;
    - 1 bit otherwise.
- Modulation and coding scheme-5 bits
- New data indicator-1 bit
- Redundancy version-2 bits
- HARQ process number-4 bits
- 1st downlink assignment index-1 or 2 bits
    - 1 bit for semi-static HARQ-ACK codebook;
    - 2 bits for dynamic HARQ-ACK codebook with single HARQ-ACK codebook.
- 2nd downlink assignment index-0 or 2 bits
    - 2 bits for dynamic HARQ-ACK codebook with two HARQ-ACK sub-codebooks;
    - 0 bit otherwise.
- TPC command for scheduled PUSCH-2 bits

- SRS resource indicator $- \left\lceil \log_2\left( \sum_{k=1}^{L_{max}} \binom{N_{SRS}}{k} \right) \right\rceil$ or $\lceil \log_2(N_{SRS}) \rceil$ bits

- $\left\lceil \log_2\left( \sum_{k=1}^{L_{max}} \binom{N_{SRS}}{k} \right) \right\rceil$ bits for non-codebook based PUSCH transmission;

- $\lceil (\log_2(N_{SRS}) \rceil$ bits for codebook based PUSCH transmission.
- Precoding information and number of layers-up to 6 bits
- Antenna ports-up to 5 bits
- SRS request-2 bits
- CSI request-0, 1, 2, 3, 4, 5, or 6 bits
- CBG(code block group) transmission information-0, 2, 4, 6, or 8 bits
  PTRS-DMRS association-0 or 2 bits.
- beta_offset indicator-0 or 2 bits
- DMRS sequence initialization-0 or 1 bit

TABLE 5

- Identifier for DCI formats - [1] bit
- Frequency domain resource assignment - $\lceil \lceil \log_2(N_{RB}^{DL,BWP}(N_{RB}^{DL,BWP}+1)/2)\rceil \rceil$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing indicator - [3] bits Alternatively, the DCI format 1_0 may be used as the DCI scheduling the PDSCH for the RAR message, and at this time, the CRC may be scrambled with the RA-RNTI. The DCI format 1_0 in which the CRC is scrambled to the C-RNTI may include information of Table 6 below.

TABLE 6

- Frequency domain resource assignment - $\lceil \log_2(N_{RB}^{DL,BWP}(N_{RB}^{DL,BWP}+1)/2)\rceil$ bits
- Time domain resource assignment - 4 bits
- VRB-to-PRB mapping - 1 bit
- Modulation and coding scheme - 5 bits
- TB scaling - 2 bits
- Reserved bits - 16 bits A DCI format 1_1 may be used as non-fallback DCI for scheduling the PDSCH and at this time, the CRC may be scrambled with the C-RNTI. According to an embodiment of the disclosure, the DCI format 1_1 in which the CRC is scrambled with the C-RNTI may include information of Table 7 below.

TABLE 7

- Carrier indicator - 0 or 3 bits
- Identifier for DCI formats - [1] bits
- Bandwidth part indicator - 0, 1 or 2 bits
- Frequency domain resource assignment
    - For resource allocation type 0, $\lceil N_{RB}^{DL,BWP}/P \rceil$ bits
    - For resource allocation type 1, $\lceil \log_2(N_{RB}^{DL,BWP}(N_{RB}^{DL,BWP}+1)/2)\rceil$ bits
- Time domain resource assignment - 1, 2, 3, or 4 bits
- VRB-to-PRB mapping - 0 or 1 bit, only for resource allocation type 1.
    - 0 bit if only resource allocation type 0 is configured;
    - 1 bit otherwise.
- PRB bundling size indicator - 0 or 1 bit
- Rate matching indicator - 0, 1, or 2 bits
- ZP CSI-RS trigger - 0, 1, or 2 bits
For transport block 1:
  - Modulation and coding scheme - 5 bits
  - New data indicator - 1 bit
  - Redundancy version - 2 bits
For transport block 2:
  - Modulation and coding scheme - 5 bits
  - New data indicator - 1 bit
  - Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit <PDSCH Time and Frequency Resource Allocation Methods>

Hereinafter, time and frequency resource allocation methods for data transmission in an NR system will be described.

In the NR system, following detailed frequency domain resource allocation methods (frequency domain resource allocation (FD-RA)) may be provided in addition to a frequency domain resource candidate allocation through BWP indication.

Figure 4:
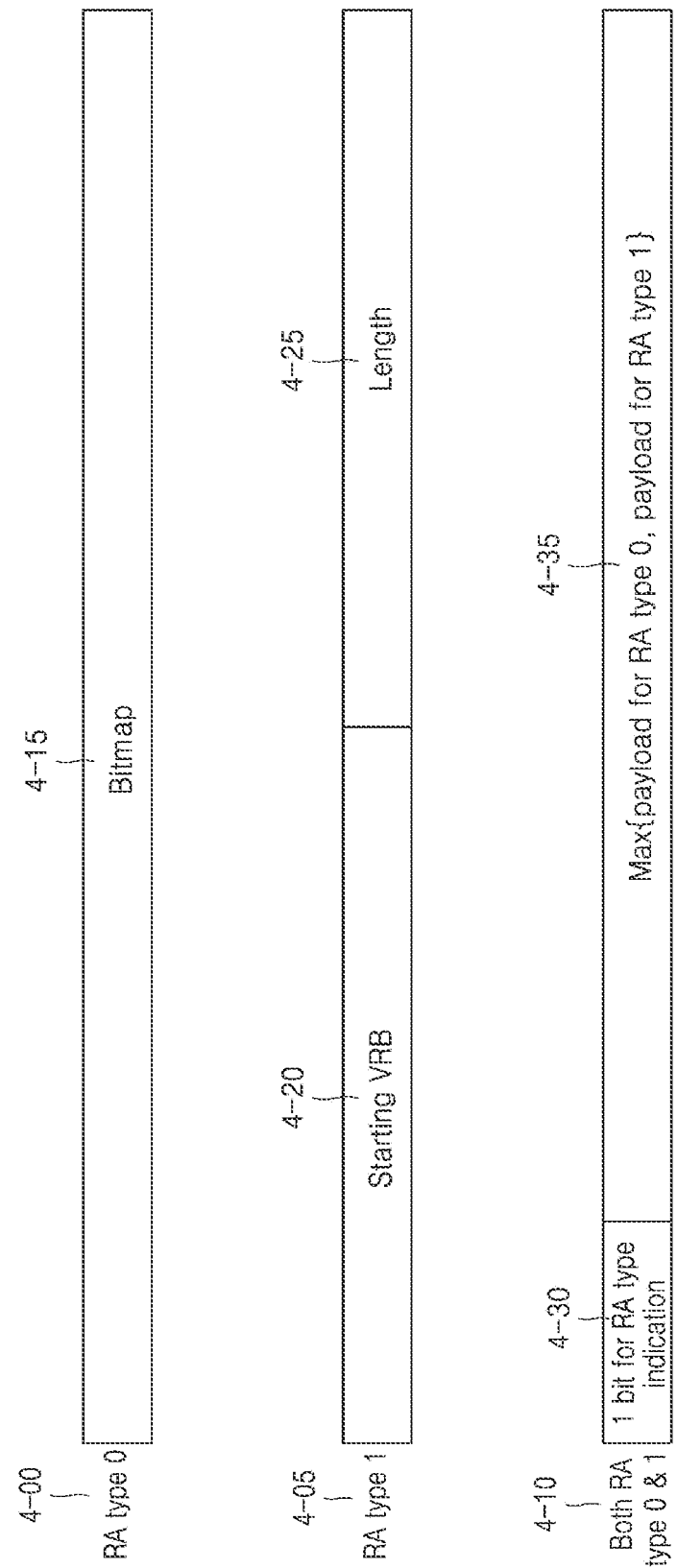
FIG. 4 illustrates a diagram showing an example of a frequency domain resource allocation for a PDSCH in a wireless communication system according to an embodiment of the present disclosure.

FIG. 4 illustrates a diagram showing an example of a frequency domain resource allocation for a PDSCH in a wireless communication system according to an embodiment of the present disclosure.

FIG. 4 illustrates three frequency domain resource allocation methods of a resource allocation (RA) type 0 4-00, an RA type 1 4-05, and a dynamic switch 4-10, which are configurable through a higher layer in an NR system.

Referring to FIG. 4, when a UE is configured to use only a resource type 0 (the RA type 0 4-00) through higher layer signaling, a part of DCI allocating a PDSCH to the UE includes a bitmap consisting of $N^{RBG}$ bits. Here, $N_{RBG}$ denotes the number of resource block groups (RBGs) determined as Table 8 below according to a BWP size allocated by a BWP indicator and a higher layer parameter rbg-Size, and data is transmitted to an RBG indicated by 1 by the bitmap.

TABLE 8

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When the UE is configured to use only a resource type 1 (RA type 1 4-05) through higher layer signaling, the part of DCI allocating the PDSCH to the UE may include frequency domain resource allocation information consisting of $\lceil \log_2 (N_{RB}^{DLBWP}(N_{RB}^{DLBWP}+1)/2) \rceil$ bits. A condition therefor will be described again below. A base station may configure a starting virtual resource block (VRB) 4-20 and a length 4-25 of a frequency domain resource continuously allocated form the starting VRB 4-20.

When the UE is configured to use both the resource type 0 and the resource type 1 (dynamic switch 4-10) through higher layer signaling, the part of DCI allocating the PDSCH to the UE includes the frequency axis allocation information consisting of bits of a greater value 4-35 from among a payload 4-15 for configuring the resource type 0 and a payload (the starting VRB 4-20 and the length 4-25) for configuring the resource type 1. A condition therefor will be described again below. Here, one bit may be added to a most significant bit (MSB) of the frequency domain resource allocation information in the DCI, and when the bit is 0, the resource type 0 may be used, and when the bit is 1, the resource type 1 may be used.

Hereinafter, a time domain resource allocation method regarding a data channel in a next-generation mobile communication system (5G or NR system) will be described.

A base station may configure a UE with Table regarding time domain resource allocation information for a PDSCH and a PUSCH, through higher layer signaling (for example, RRC signaling). For the PDSCH, Table consisting of up to maxNrofDL-Allocations=16 entries may be configured, and for the PUSCH, Table consisting of up to maxNrofUL-Allocations=16 entries may be configured. According to an embodiment of the disclosure, the time domain resource allocation information may include PDCCH-to-PDSCH slot timing (corresponds to a time interval in units of slots between a time point when the PDCCH is received and a time point when the PDSCH scheduled by the received PDCCH is transmitted, indicated by $K_0$, information about a location and length of a starting symbol in which the PDSCH is scheduled in a slot, and a PDSCH mapping type. For example, following pieces of information of Table 9 may be notified from the base station to the UE.

TABLE 9

| PDSCH-TimeDomainResourceAllocationList information element |
| --- |
| PDSCH-TimeDomainResourceAllocationList := SEQUENCE (SIZE(1..maxNrofDL-Allocations)) OF PDSCH-TimeDomainResourceAllocation<br>PDSCH-TimeDomainResourceAllocation := SEQUENCE {<br>  k0    INTEGER(0..32)    OPTIONAL, -- Need S<br>  (PDCCH-to-PDSCH timing, Slot Unit)<br>  mappingType    ENUMERATED {typeA, typeB},<br>  (PDSCH Mapping Type)<br>  startSymbolAndLength    INTEGER (0..127)<br>  (Starting Symbol and Length of PDSCH)<br>} |

The base station may notify the UE about one of entries in Table of the time domain resource allocation information, through L1 signaling (for example, DCI) (for example, indicated through a "time domain resource allocation" field within DCI). The UE may obtain the time domain resource allocation information for the PDSCH or PUSCH, based on the DCI received from the base station.

Figure 5:
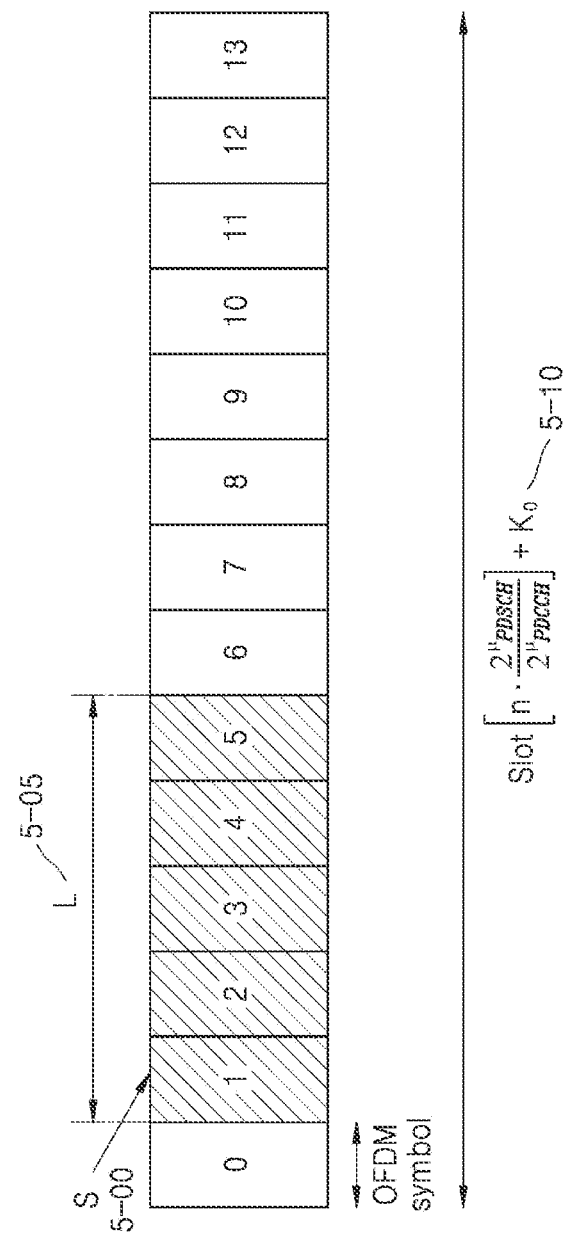
FIG. 5 illustrates a diagram showing an example of a time domain resource allocation for a PDSCH in a wireless communication system according to an embodiment of the present disclosure.

FIG. 5 illustrates a diagram showing an example of a time domain resource allocation for a PDSCH in a wireless communication system according to an embodiment of the disclosure.

Referring to FIG. 5, a base station may indicate a time axis location of a PDSCH resource, according to subcarrier spacings (SCSs) ($\mu_{PDSCH}$, $\mu_{PDCCH}$) of a data channel and control channel configured by using a higher layer, a value of a slot offset $K_0$, and an OFDM symbol starting location 5-00 and length 5-05 in one slot 5-10 dynamically indicated through DCI.

Figure 6:
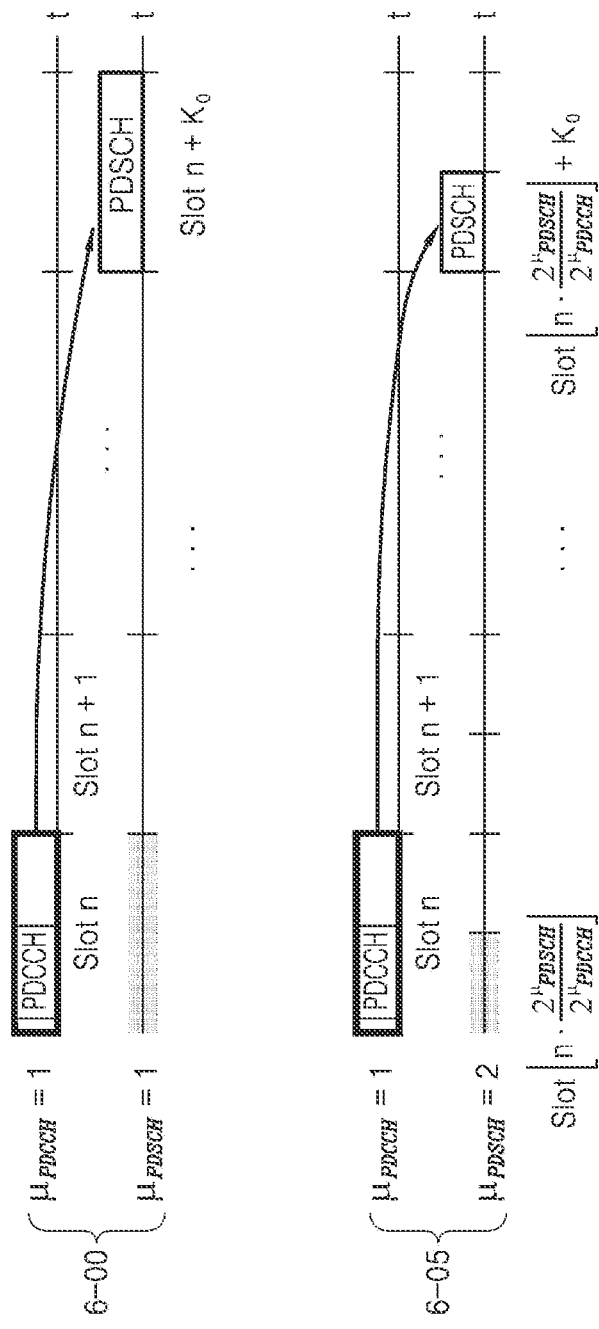
FIG. 6 illustrates a diagram of an example of a time domain resource allocation according to subcarrier spacings of a data channel and control channel in a wireless communication system according to an embodiment of the present disclosure.

FIG. 6 illustrates a diagram of an example of a time domain resource allocation according to subcarrier spacings of a data channel and control channel in a wireless communication system according to an embodiment of the disclosure.

Referring to FIG. 6, when the subcarrier spacings of the data channel and control channel are the same (a case 6-00, $\mu_{PDSCH}=\mu_{PDCCH}$), slot numbers for data and control are the same, and thus a base station and a UE determine that a scheduling offset is generated according to a pre-determined slot offset $K_0$. On the other hand, when the subcarrier spacings of the data channel and control channel are different (a case 6-05, $\mu_{PDSCH}\neq\mu_{PDCCH}$), the slot numbers for data and control are different, and thus the base station and the UE determine that the scheduling offset is generated according to the pre-determined slot offset $K_0$, based on a subcarrier spacing of a PDCCH.

<Method and Apparatus for Transmitting Hybrid Automatic Repeat Request Acknowledgement (HARQ-ACK) Feedback>

An NR system employs an HARQ scheme in which a physical layer retransmits data when a decoding failure occurs in initial transmission. In the HARQ scheme, when a receiver fails to accurately decode data, the receiver transmits information (negative acknowledgment (NACK)) indicating the decoding failure to a transmitter so that the transmitter may retransmit the corresponding data in the physical layer. The receiver combines the data retransmitted by the transmitter with the data whose previous decoding had failed so as to improve data reception performance. In addition, when the receiver accurately decodes the data, the receiver may transmit information (acknowledgment (ACK)) indicating successful decoding to the transmitter so that the transmitter may transmit new data.

Hereinafter, a method and apparatus for transmitting HARQ-ACK feedback regarding downlink data transmission will be described. In detail, a method of configuring HARQ-ACK feedback bits when a UE is to transmit multiple HARQ-ACKs in one slot through an uplink will be described.

In a wireless communication system, in particular, an NR system, a base station may configure the UE with one or a plurality of component carriers (CCs) for downlink transmission. Also, downlink transmission and uplink transmission slots and symbols may be configured in each CC. Meanwhile, when a PDSCH, i.e., downlink data, is scheduled, at least one of slot timing information to which the PDSCH is mapped in a specific bit field of DCI, information about a location of a starting symbol to which the PDSCH is mapped in a slot, or information about the number of symbols to which the PDSCH is mapped may be transmitted. For example, when the DCI is transmitted in a slot n and the PDSCH is scheduled, and when $K_0$ that is the slot timing information for transmitting the PDSCH indicates 0, the starting symbol location is 0, and a symbol length is 7, the PDSCH is transmitted by being mapped from a $0^{th}$ symbol to a $7^{th}$ symbol of the slot n. The HARQ-ACK feedback is transmitted from the UE to the base station after a K1 slot after the PDSCH that is a downlink data signal is transmitted. K1 information that is timing information for transmitting the HARQ-ACK feedback is transmitted through the DCI, a candidate group of available K1 values is transmitted through higher signaling, and one of the K1 values may be determined through the DCI.

When the UE is configured with a semi-static HARQ-ACK codebook, the UE may determine Table including $K_0$, i.e., slot information to which the PDSCH is mapped, starting symbol information, and information about the number of length of symbols, and a feedback bit (or an HARQ-ACK codebook size) to be transmitted according to K1 candidate values, i.e., HARQ-ACK feedback timing information for the PDSCH. The table including the slot information to which the PDSCH is mapped, the starting symbol information, and the information about the number of length of symbols may follow default values or may be configured by the base station for the UE.

When the UE is configured with a dynamic HARQ-ACK codebook, the UE may determine an HARQ-ACK feedback bit (or an HARQ-ACK codebook size) to be transmitted by the UE according to downlink assignment indicator (DAI) information included in the DCI from a slot in which HARQ-ACK information is transmitted by $K_0$, i.e., the slot information to which the PDSCH is mapped, and a K1 value, i.e., the HARQ-ACK feedback timing information for the PDSCH.

Figure 7:
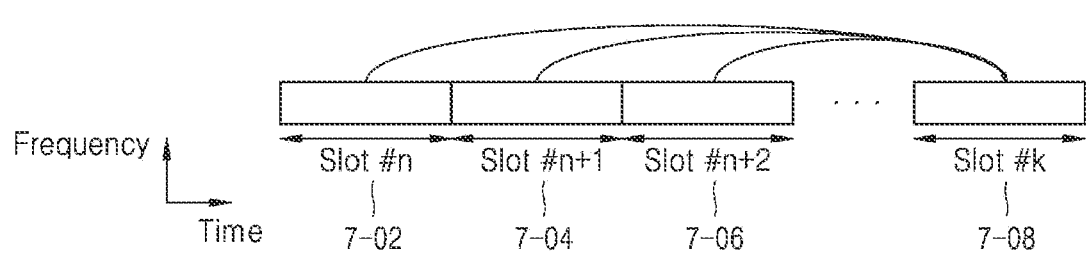
FIG. 7 illustrates a diagram showing a method of configuring a semi-static HARQ-ACK codebook in an NR system according to an embodiment of the present disclosure.

FIG. 7 illustrates a diagram showing a method of configuring a semi-static HARQ-ACK codebook in an NR system.

When a UE receives a higher layer signal configuring semi-static HARQ-ACK codebook in a situation where the number of HARQ-ACK PUCCHs transmittable by the UE in one slot is limited to one, the UE reports HARQ-ACK information regarding reception of a PDSCH in an HARQ-ACK codebook or semi-persistent scheduling (SPS) PDSCH release, in a slot indicated by a value of a PDSCH-to-HARQ_feedback timing indicator in a DCI format 1_0 or DCI format 1_1. The UE reports NACK for an HARQ-ACK information bit value in the HARQ-ACK codebook, in a slot not indicated by a field of the PDSCH-to-HARQ_feedback timing indicator in the DCI format 1_0 or DCI format 1_1. When the UE reports only the HARQ-ACK information regarding one SPS PDSCH release or one PDSCH reception for $M_{A,c}$ cases for candidate PDSCH reception, wherein the reporting is scheduled by the DCI format 1_0 including information indicating a counter DAI field in a primary cell (Pcell) is 1, the UE determines one HARQ-ACK codebook for the SPS PDSCH release or PDSCH reception. In other cases, the HARQ-ACK codebook is determined according to the method described as follows.

When a group of PDSCH reception candidates in a serving cell c is $M_{A,c}$, the $M_{A,c}$ may be obtained through operations of [pseudo-code 1] below.

[Start Pseudo-Code 1]
Operation 1: initialize j to 0 and $M_{A,c}$ to an empty set. Initialize k, i.e., an HARQ-ACK transmission timing index, to 0.
Operation 2: configure R as a group of rows in the table including slot information to which a PDSCH is mapped, the starting symbol information, and the information about the number or length of the symbols. When a mapping symbol for the PDSCH indicated by each value of R is configured to be an uplink symbol according to downlink and uplink configurations configured by a higher layer, delete a corresponding row from R.
Operation 3-1: when the UE is able to receive one PDSCH for unicast in one slot and R is not an empty set, add 1 to the $M_{A,c}$.
Operation 3-2: when the UE is able to receive more than one PDSCH for unicast in one slot, count the number of PDSCHs allocatable to different symbols in the calculated R, and add a value equal to the number of PDSCHs to the $M_{A,c}$.
Operation 4: start again from operation 2 by increasing k by 1.
[End Pseudo-Code 1]

Referring to FIG. 7 as an example of the pseudo-code 1, all slot candidates for PDSCH-to-HARQ-ACK timing capable of indicating a slot #k 7-08 are considered to perform HARQ-ACK PUCCH transmission in the slot #k 7-08. In FIG. 7, it is assumed that HARQ-ACK transmission is possible in the slot #k 7-08 according to a PDSCH-to-HARQ-ACK timing combination in which only PDSCHs scheduled in a slot #n 7-02, a slot #n+1 7-04, and a slot #n+2 7-06 are possible. Also, the maximum number of schedulable PDSCHs is derived for each slot, considering information indicating whether a symbol in a slot is downlink or uplink, and time domain resource configuration information of the PDSCH schedulable in each of the slot #n 7-02, the slot #n+1 7-04, and the slot #n+2 7-06. For example, when up to two PDSCHs are schedulable in the slot #n 7-02, up to three PDSCHs are schedulable in the slot #n+1 7-04, and up to two PDSCHs are schedulable in the slot #n+2 7-06, the maximum number of PDSCHs included in an HARQ-ACK codebook transmitted from the slot #k 7-08 is 7. This is referred to as a cardinality of a size of a group of the HARQ-ACK codebook.

Figure 8:
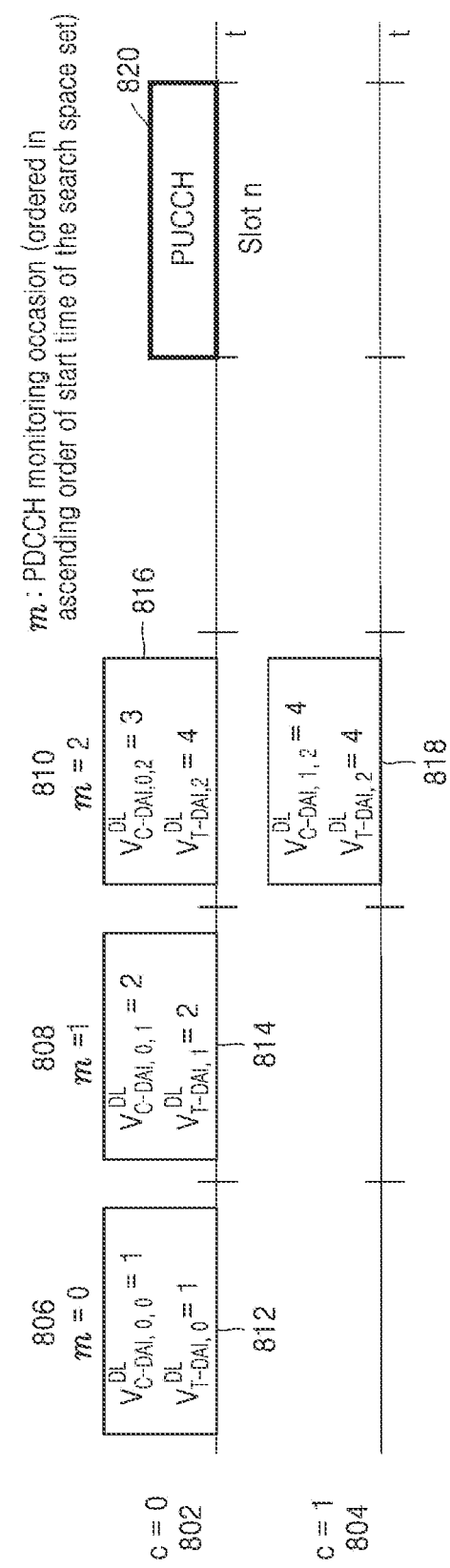
FIG. 8 illustrates a diagram showing a method of configuring a dynamic HARQ-ACK codebook in an NR system according to an embodiment of the present disclosure.

FIG. 8 illustrates a diagram showing a method of configuring a dynamic HARQ-ACK codebook in an NR system according to an embodiment of the present disclosure.

A UE transmits HARQ-ACK information that is transmitted within one PUCCH from a slot n for PDSCH reception or SPS PDSCH release, based on a value of PDSCH-to-HARQ_feedback timing for PUCCH transmission of the HARQ-ACK information, and $K_0$ that is information about a transmission slot location of PDSCH scheduled by DCI format 1_0 or 1_1. In detail, to transmit the HARQ-ACK information, the UE determines an HARQ-ACK codebook of the PUCCH transmitted from a slot determined by the PDSCH-to-HARQ_feedback timing and the $K_0$, based on DAI included in DCI indicating the PDSCH reception or SPS PDSCH release.

The DAI includes a counter DAI and a total DAI. The counter DAI is information indicating where in the HARQ-ACK codebook the HARQ-ACK information corresponding to the PDSCH scheduled by the DCI format 1_0 or DCI format 1_1 is located. In detail, a value of the counter DAI in the DCI format 1_0 or 1_1 indicates an accumulated value of the PDSCH reception or SPS PDSCH release scheduled by the DCI format 1_0 or DCI format 1_1 in a specific cell c. The accumulated value is set based on a serving cell and a PDCCH monitoring occasion where the scheduled DCI is present.

The total DAI is a value indicating a size of the HARQ-ACK codebook. In detail, the value of total DAI denotes the total number of previously scheduled PDSCH receptions or SPS PDSCH releases including a time point when the DCI is scheduled (PDCCH monitoring occasion). Also, the total DAI is a parameter used when HARQ-ACK information in a serving cell c also includes HARQ-ACK information for the PDSCH scheduled in another cell including the serving cell c, in a carrier aggregation (CA) situation. In other words, a total DAI parameter does not exist in a system operating in one cell.

FIG. 8 illustrates an example of an operation of the UE related to the DAI when a dynamic HARQ-ACK codebook is used. FIG. 8 illustrates changes in values of counter DAI (C-DAI) and total DAI (T-DAI) indicated by DCI found for each PDCCH monitoring occasion configured for each carrier, when two carriers are configured for the UE and when a HARQ-ACK codebook selected based on DAI is transmitted from an nth slot of a carrier 0 802, on a PUCCH 820. First, in the DCI found in m=0 806, the C-DAI and the T-DAI each indicate a value 812 of 1. In the DCI found in m=1 808, the C-DAI and the T-DAI each indicate a value 814 of 2. In the DCI found in the carrier 0 802 (c=0) of m=2 810, the C-DAI indicates a value 816 of 3. In the DCI found in a carrier 1 804 (c=1) of m=2 810, the C-DAI indicates a value 818 of 4. Here, when the carrier 0 802 and the carrier 1 804 are scheduled in a same monitoring occasion, the T-DAIs both indicate 4.

In FIGS. 7 and 8, the HARQ-ACK codebook is determined under an assumption that one PUCCH containing HARQ-ACK information is transmitted in one slot. As one example of a method of determining one PUCCH transmission resource in one slot, when PDSCHs scheduled by different DCIs are multiplexed into one HARQ-ACK codebook in a same slot and transmitted, a PUCCH resource selected for HARQ-ACK transmission is determined to be a PUCCH resource indicated by a PUCCH resource field indicated by DCI that scheduled a PDSCH last. In other words, a PUCCH resource indicated by a PUCCH resource field indicated by DCI scheduled before the DCI is ignored.

In Rel-16 URLLC, latency in one slot is minimized and a sub-slot is introduced to transmit multiple HARQ-ACK feedback. Description below assumes a situation in which two or more PUCCHs containing HARQ-ACK information may be transmitted in one slot. For example, when a higher layer parameter subslotLengthForPUCCH (may include information about a length of a sub-slot for a PUCCH) is configured in the UE, the PUCCH containing the HARQ-ACK information may be transmitted in the sub-slot. The higher layer parameter subslotLengthForPUCCH may configure the number of symbols included in the sub-slot. In a general cyclic prefix (CP), 2 or 7 symbols may be configured, and in an extended CP, 2 or 6 symbols may be configured. When the use of a sub-slot is configured by a higher layer parameter, the number of symbols included in a slot associated with a PUCCH to be transmitted by the UE follows the higher layer parameter, for example, subslotLengthForPUCCH. For example, when it is indicated that the number of symbols included in the sub-slot is 2, the UE may determine that 7 sub-slots are present in one slot.

When the sub-slot is configured by the higher layer parameter, the UE transmits the HARQ-ACK information transmitted in one PUCCH from the slot n for the PDSCH reception or SPS PDSCH release, based on the value of PDSCH-to-HARQ_feedback timing for the PUCCH transmission of the HARQ-ACK information, and the $K_0$ that is the information about the transmission slot location of the PDSCH scheduled by the DCI format 1_0 or 1_1. To transmit the HARQ-ACK information, the UE determines the HARQ-ACK codebook of the PUCCH transmitted from a sub-slot determined by the PDSCH-to-HARQ_feedback timing and the $K_0$, based on the DAI included in DCI indicating the PDSCH reception or SPS PDSCH release. In detail, the UE may be configured with a value of a sub-slot offset K1 indicating the PDSCH-to-HARQ_feedback timing by the DCI or higher layer parameter.

In terms of the Rel 16 3GPP standard, a reference slot (or a reference sub-slot) of K1 (i.e., a reference slot or reference sub-slot for counting a value of K1 indicating HARQ-ACK feedback timing, and a slot or reference sub-slot where HARQ-ACK is transmitted when the K1 has a value of 0) corresponds to the last slot (or sub-slot) for PUCCH transmission overlapping with a received PDSCH or a PDCCH including DCI indicating a SPS PDSCH release (operation 1). For convenience of description, an operation of a UE determining the reference slot of the K1 is defined as "operation 1." However, the UE may not determine the HARQ-ACK feedback timing for downlink data transmission according to "operation 1," but may determine the HARQ-ACK feedback timing for the downlink data transmission according to "operation 2" described below. According to "operation 2," the reference slot (or the reference sub-slot) of the K1 (i.e., the slot or reference sub-slot where HARQ-ACK is transmitted when the K1 has a value of 0) corresponds to the last slot (or sub-slot) for the PUCCH transmission overlapping with a downlink slot for the received PDSCH or the PDCCH including the DCI indicating the SPS PDSCH release (operation 2). When a sub-slot is configured by a higher layer parameter, operations described below are performed in units of sub-slots.

Figure 9:
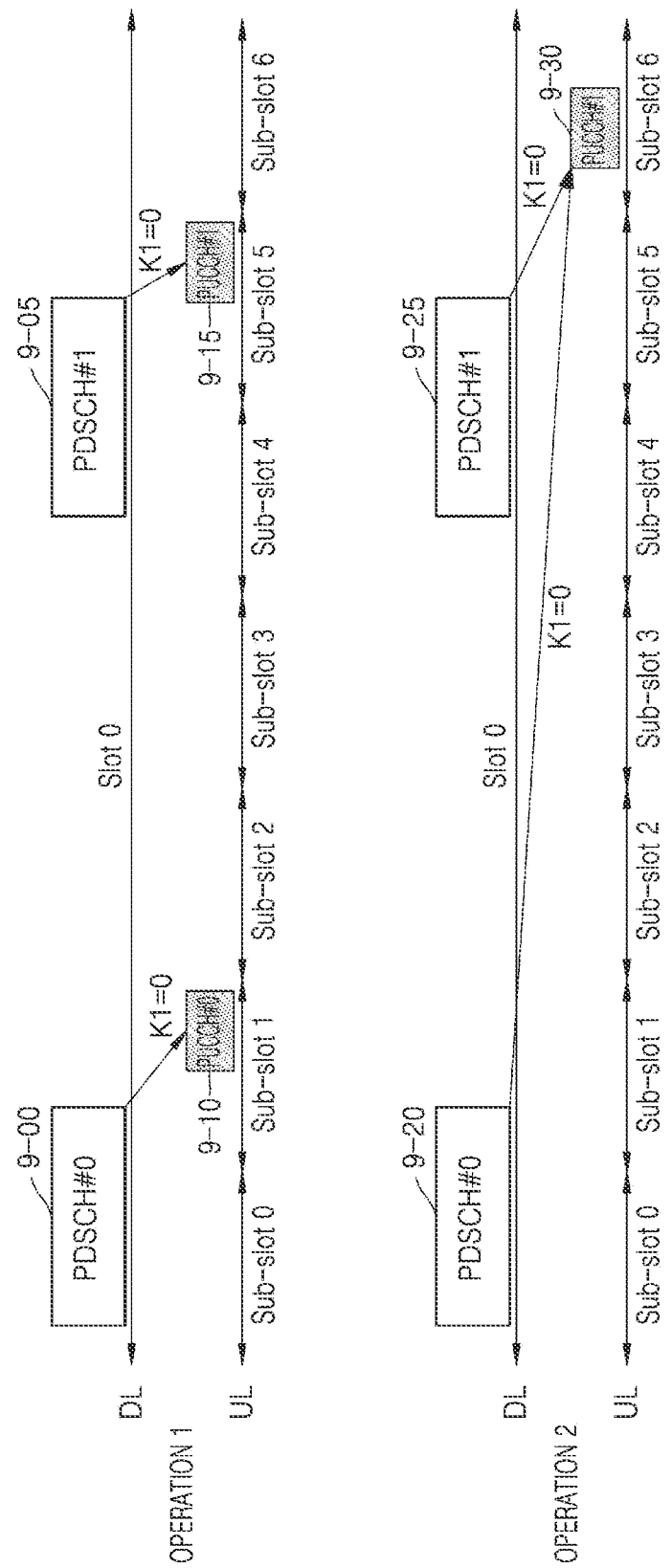
FIG. 9 illustrates examples of "operation 1" and "operation 2" for a physical uplink control channel (PUCCH) transmission time including HARQ-ACK for downlink data transmission, when the use of a sub-slot is configured in a wireless communication system, according to an embodiment of the present disclosure.

FIG. 9 illustrates examples of "operation 1" and "operation 2" for a PUCCH transmission time including HARQ-ACK for downlink data transmission, when the use of a sub-slot is configured in a wireless communication system.

Referring to FIG. 9, when the number of symbols configuring a sub-slot is 2, K1=0 is provided by DCI, and a UE receives PDSCH #0 and PDSCH #1 from a downlink slot 0, a PUCCH containing HARQ-ACK corresponding to each downlink data transmission may be transmitted from a designated sub-slot. When the UE transmits the HARQ-ACK through "operation 1," a PUCCH #0 9-10 corresponding to a PDSCH #0 9-00 is transmitted from a sub-slot 1 that is the last slot from among sub-slots overlapping the PDSCH #0 9-00. In the same manner, a PUCCH #1 9-15 corresponding to a PDSCH #1 9-05 is transmitted from a sub-slot 5. When the UE transmits the HARQ-ACK through "operation 2," a PUCCH #1 9-30 corresponding to a PDSCH #0 9-20 is transmitted from a sub-slot 6 that is the last slot from among sub-slots overlapping a downlink slot including the PDSCH #0 9-20. In the same manner, the PUCCH #1 9-30 corresponding to a PDSCH #1 9-25 is transmitted from the sub-slot 6. The HARQ-ACKs corresponding to the PDSCH #0 9-20 and PDSCH #1 9-25 are multiplexed into one HARQ-ACK codebook in a PUCCH #1 9-30.

When the UE transmits HARQ-ACK feedback according to "operation 2," a reference sub-slot is always fixed to the last sub-slot from among sub-slots overlapping a downlink slot including a PDSCH, and thus there may be a benefit in terms of UE implementation complexity. However, because a PUCCH including HARQ-ACK is unable to be transmitted before a reference sub-slot, latency occurs, and thus immediate HARQ-ACK feedback supported in "operation 1" may not be performed. In this case, a wireless communication service used for a specific purpose, such as URLLC, may be unable to provide ultra-low latency communication.

Hereinafter, a method by which a UE performs "operation 2" for HARQ-ACK feedback regarding downlink data transmission, and when the use of a sub-slot is configured, maintains "operation 1" for the HARQ-ACK feedback regarding the downlink data transmission, or a method for bringing a result similar to "operation 1" will be described. The method provided in the disclosure may reduce HARQ-ACK feedback complexity by using "operation 2" in a general communication situation, and provide an ultra-low latency communication service by using "operation 1" in a situation where the ultra-low latency communication service is required.

<Method 1: Method for HARQ-ACK Feedback, Based on Operation 1 in Specific Condition>

A UE may detect a DCI format 1_0, 1_1, or 1_2 in a configured search area, and receive an indication for PDSCH reception or SPS PDSCH release. The UE may determine, through DCI, a starting symbol, a length of a symbol, and $K_0$ that is transmission slot location information of a scheduled PDSCH, and when a PDCCH including SPS PDSCH release information is detected, may be configured with the starting symbol, the length of the symbol, and the transmission slot location information by a higher layer. For HARQ-ACK feedback regarding received downlink data transmission, the UE determines an HARQ-ACK codebook in a slot determined by PDSCH-to-HARQ_feedback timing included in the received DCI, and transmits a PUCCH. Here, when a sub-slot is not configured for the UE, for example, a higher layer parameter subslotLengthForPUCCH is not configured, the UE may determine a slot for transmitting the PUCCH, based on "operation 2" described above. On the other hand, when the higher layer parameter subslotLengthForPUCCH is configured for the UE, the UE determines a sub-slot for transmitting the PUCCH, based on "operation 1" described above.

Figure 10:
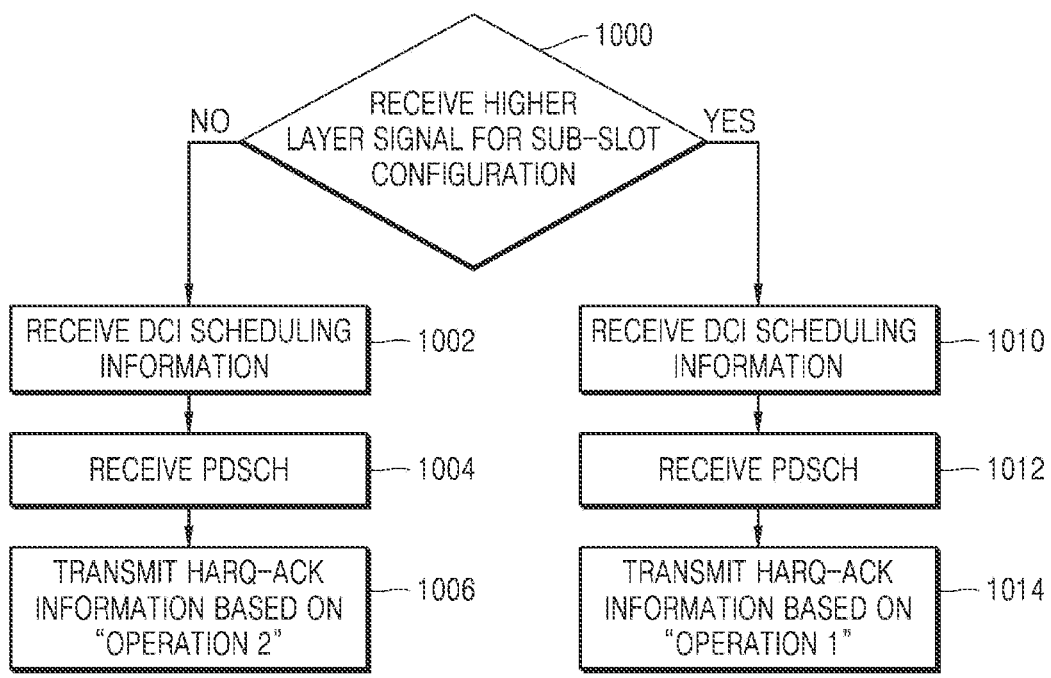
FIG. 10 illustrates a user equipment (UE) operation diagram showing uplink control information transmission associated with downlink data reception, by using sub-slot configuration and information, according to an embodiment of the present disclosure.

FIG. 10 illustrates a UE operation diagram showing uplink control information transmission associated with downlink data reception, by using sub-slot configuration and information, according to an embodiment of the present disclosure.

In FIG. 10, an example of determining a method by which a UE transmits HARQ-ACK information for a PDSCH, according to a higher layer signal, will be described. The UE may or may not obtain configuration information (subslotLengthForPUCCH) for a sub-slot, through a higher layer signal, in operation 1000.

When the UE has not obtained the configuration information for the sub-slot through the higher layer signal, the UE may determine that a smallest unit of K1 indicating PDSCH-to-HARQ-ACK timing is a slot unit. The higher layer signal may include at least one of dl-DataToUL-ACK, dl-DataToUL-ACK-r16, or dl-DataToUL-ACKForDCIFormat1_2, which are included in a PDSCH-to-HARQ-ACK timing value list. Then, the UE may receive, through DCI, information about a resource region to which a PDSCH is allocated, and a PUCCH resource region through which HARQ-ACK information for the PDSCH is transmitted, in operation 1002. The DCI may include a value of K1 indicating the PDSCH-to-HARQ_feedback timing from the higher layer information (dl-DataToUL-ACK, dl-DataToUL-ACK-r16, or dl-DataToUL-ACKForDCIFormat1_2). When the DCI does not include a field for the value of K1, the UE may receive the value of K1 from at least one of dl-DataToUL-ACK, dl-DataToUL-ACK-r16, or dl-DataToUL-ACKForDCIFormat1_2, i.e., the higher layer signal information.

The UE may receive the PDSCH from a PDSCH resource region scheduled by the DCI, in operation 1004. The UE may transmit the HARQ-ACK information for the PDSCH from the PUCCH resource region, based on the information about the PUCCH resource region included in the DCI, according to "operation 2" described above, in operation 1006. According to "operation 2" described above, the UE may determine the last slot of PUCCH transmission overlapping a downlink slot including the received PDSCH as a reference slot of the K1, and transmit the HARQ-ACK information in a PUCCH transmission slot determined based on the value of K1 obtained from the DCI or higher layer signal.

On the other hand, the UE may obtain the configuration information for the sub-slot through the higher layer signal. The configuration information for the sub-slot may include a length of a sub-slot, the number of sub-slots in one slot, or information indicating that a smallest unit of K1 indicating PDSCH-to-HARQ-ACK timing is a sub-slot. The higher layer signal may include at least one of the dl-DataToUL-ACK, the dl-DataToUL-ACK-r16, or the dl-DataToUL-ACKForDCIFormat1_2, which are included in the PDSCH-to-HARQ-ACK timing value list. The UE may receive, through the DCI, the information about the resource region to which the PDSCH is allocated, and the PUCCH resource region through which the HARQ-ACK information for the PDSCH is transmitted, in operation 1010. The DCI may include DCI format 1_1 and 1_2. The UE may receive the PDSCH from the PDSCH resource region scheduled by the DCI, in operation 1012.

The UE may transmit the HARQ-ACK information for the PDSCH from the PUCCH resource region, based on the information about the PUCCH resource region included in the DCI, according to "operation 1" described above, in operation 1014. According to "operation 1" described above, the UE may determine the last sub-slot of the PUCCH transmission overlapping the received PDSCH as the reference slot of the K1, and transmit the HARQ-ACK information from a PUCCH transmission sub-slot determined based on the value of K1 in units of sub-slots, obtained from the DCI or higher layer signal.

<Method 2: Method for HARQ-ACK Feedback by using Value of Negative K1>

When a UE performs "operation 2" for HARQ-ACK feedback for downlink data transmission and the use of a sub-slot is configured as described above, a base station may indicate negative K1 such that a result similar to "operation 1" is obtained. The negative K1 may be defined as a slot offset value indicating PDSCH-to-HARQ-ACK timing, and unlike general K1 indicating a slot after a reference K1 slot, the negative K1 may indicate a slot before the reference K1 slot.

Figure 11:
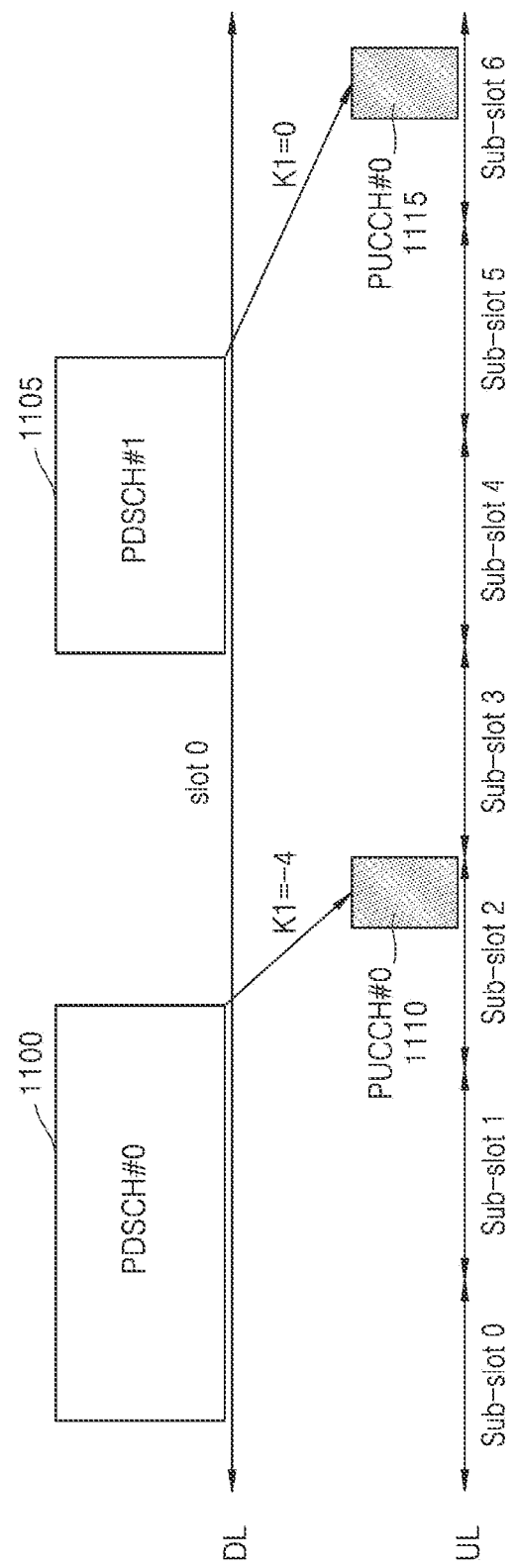
FIG. 11 illustrates an example of a PUCCH transmission time including HARQ-ACK for downlink data transmission, when the use of a sub-slot is configured and negative K1 is used in a wireless communication system, according to an embodiment of the present disclosure.

FIG. 11 illustrates an example of a PUCCH transmission time including HARQ-ACK for downlink data transmission, when the use of a sub-slot is configured and negative K1 is used in a wireless communication system, according to an embodiment of the present disclosure.

Referring to FIG. 11, when the number of symbols configuring a sub-slot is 2, a UE receives a PDSCH #0 1100 and a PDSCH #1 1105 from a downlink slot 0, and values of K1 are respectively indicated as −4 and 0, a PUCCH containing HARQ-ACK corresponding to PDSCH transmission may be transmitted from a designated sub-slot. The UE may be configured with K1=−4 by at least one of a higher layer signal (RRC or MAC CE) or DCI scheduling the PDSCH #0 1100, and transmit a PUCCH #0 1110 containing HARQ-ACK corresponding to transmission of the PDSCH #0 1100 in a sub-slot 2. The UE may be configured with K1=0 by a higher layer signal or DCI scheduling the PDSCH #1 1105, and transmit a PUCCH #0 1115 containing HARQ-ACK corresponding to transmission of the PDSCH #1 1105 in a sub-slot 6 that is the last sub-slot from among sub-slots overlapping a downlink slot including the PDSCH #1 1105.

Hereinafter, a method of indicating negative K1 to a UE will be described.

Method 2-1) When DCI contains a PDSCH-to-HARQ_feedback timing indicator field, negative K1 may be used when a list provided by at least one of higher layer signals (RRC: dl-DataToUL-ACK or dl-DataToUL-ACKForDCI-Format1_2) includes a value of negative K1 and an entry value provided by the DCI indicates the negative K1. The list provided by the higher layer signal may include both general K1 and negative K1. When the DCI does not contain the PDSCH-to-HARQ_feedback timing indicator field, the higher layer signal may provide the negative K1. Meanwhile, because the higher layer signal Dl-DataToUL-ACK-r16 uses K1=−1 as a value of non-numerical K1 (NNK1) in an unlicensed band, the negative K1 may collide. Accordingly, when the higher layer signal Dl-DataToUL-ACK-r16 is configured, a negative K1 configuration of a UE may be restricted.

Method 2-2) When DCI contains a 1-bit field indicating negative K1 (for example, a negative-PDSCH-to-HARQ_feedback timing flag), a PDSCH-to-HARQ_feedback timing indicator field indicates an entry configured by a list provided by a higher layer signal (MAC-CE), and a UE may be configured with a value of the negative K1 by the configured entry. The list provided by the higher layer signal may only include the value of negative K1. When the DCI does not contain the negative-PDSCH-to-HARQ_feedback timing flag, the PDSCH-to-HARQ_feedback timing indicator field does not indicate a value of the entry in the list provided by the higher layer signal (MAC-CE).

Figure 12:
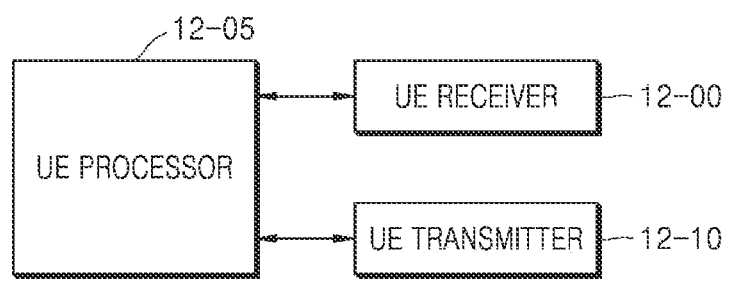
FIG. 12 illustrates a diagram of a structure of a UE in a wireless communication system according to an embodiment of the present disclosure.

FIG. 12 illustrates a block diagram of a structure of a UE in a wireless communication system according to an embodiment of the disclosure.

Referring to FIG. 12, the UE may include a UE receiver 12-00, a UE transmitter 12-10, and a UE processor (controller) 12-05.

The UE receiver 12-00 and the UE transmitter 12-10 may be collectively referred to as a transceiver. The UE receiver 12-00, the UE transmitter 12-10, and the UE processor 12-05 of the UE may operate according to a communication method of the UE described above. However, the components of the UE are not limited thereto. For example, the UE may include more or fewer components (for example, a memory or the like) than those described above. In addition, the UE receiver 12-00, the UE transmitter 12-10, and the UE processor 12-05 may be implemented in one chip.

The UE receiver 12-00 and the UE transmitter 12-10 (or the transceiver) may transmit or receive a signal to or from a base station. Here, the signal may include control information and data. In this regard, the transceiver may include an RF transmitter for up-converting and amplifying a frequency of a transmitted signal, and a RF receiver for amplifying low-noise and down-converting a frequency of a received signal. However, this is only an example of the transceiver and components of the transceiver are not limited to the RF transmitter and the RF receiver.

Also, the transceiver may receive and output, to the UE processor 12-05, a signal through a wireless channel, and transmit a signal output from the UE processor 12-05 through the wireless channel.

A memory (not shown) may store a program and data required for operations of the UE. Also, the memory may store control information or data included in a signal obtained by the UE. The memory may be a storage medium, such as read-only memory (ROM), random access memory (RAM), a hard disk, a CD-ROM, and a DVD, or a combination of storage media.

The UE processor 12-05 may control a series of processes such that the UE operates according to an embodiment of the disclosure described above. The UE processor 12-05 may be configured as a controller or one or more processors.

Figure 13:
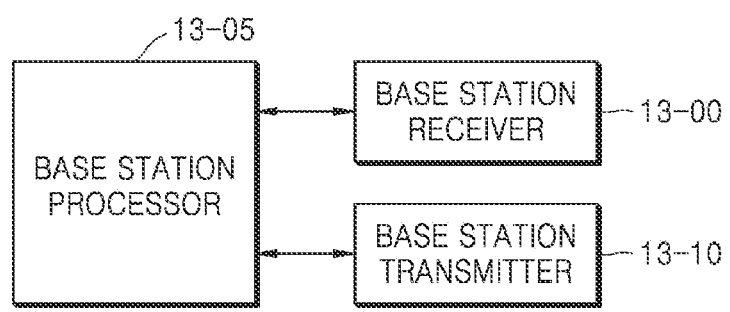
FIG. 13 illustrates a diagram of a structure of a base station in a wireless communication system according to an embodiment of the present disclosure.

FIG. 13 illustrates a block diagram of a structure of a base station in a wireless communication system according to an embodiment of the present disclosure.

Referring to FIG. 13, the base station may include a base station receiver 13-00, a base station transmitter 13-10, and a base station processor (controller) 13-05.

The base station receiver 13-00 and the base station transmitter 13-10 may be collectively referred to as a transceiver. The base station receiver 13-00, the base station transmitter 13-10, and the base station processor 13-05 of the base station may operate according to a communication method of the base station described above. However, the components of the base station are not limited thereto. For example, the base station may include more or fewer components (for example, a memory or the like) than those described above. In addition, the base station receiver 13-00, the base station transmitter 13-10, and the base station processor 13-05 may be implemented in one chip.

The base station receiver 13-00 and the base station transmitter 13-10 (or the transceiver) may transmit or receive a signal to or from a UE. Here, the signal may include control information and data. In this regard, the transceiver may include an RF transmitter for up-converting and amplifying a frequency of a transmitted signal, and a RF receiver for amplifying low-noise and down-converting a frequency of a received signal. However, this is only an example of the transceiver and components of the transceiver are not limited to the RF transmitter and the RF receiver.

Also, the transceiver may receive and output, to the base station processor 13-05, a signal through a wireless channel, and transmit a signal output from the base station processor 13-05 through the wireless channel.

A memory (not shown) may store a program and data required for operations of the base station. Also, the memory may store control information or data included in a signal obtained by the base station. The memory may be a storage medium, such as read-only memory (ROM), random access memory (RAM), a hard disk, a CD-ROM, and a DVD, or a combination of storage media.

The base station processor 13-05 may control a series of processes such that the base station operates according to an embodiment of the disclosure described above. The base station processor 13-05 may be configured as a controller or one or more processors.

According to the disclosure, a UE in a wireless communication system may have a small latency time for HARQ-ACK feedback regarding downlink data transmission and provide an ultra-low latency communication service, when a specific condition is satisfied.

Meanwhile, in a drawing for describing a method of the disclosure, an order of the description does not necessarily correspond to an order of execution, and the order may be changed or executed in parallel.

Alternatively, in the drawing for describing the method of the disclosure, some components may be omitted and only some components may be included within a range that does not depart from the essence of the disclosure.

Further, the method of the disclosure may be performed in a combination of some or all of content included in each embodiment of the disclosure within a range that does not depart from the essence of the disclosure.

Although not described in the disclosure, a separate table or information including at least one component included in Table provided in the disclosure may be used.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. A machine-readable storage medium may be provided in a form of a non-transitory storage medium. Here, the "non-transitory storage medium" only denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment of the disclosure, a method according to various embodiments of the disclosure disclosed in the present specification may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store (for example, Play Store™) or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a wireless communication system, the method comprising:
    receiving, from a base station, a physical downlink control channel (PDCCH) or a physical downlink shared channel (PDSCH);
    identifying a slot associated with a physical uplink control channel (PUCCH) transmission, wherein identifying the slot comprises:
        in case that a higher layer parameter configuring a sub-slot for a PUCCH is configured, identifying that the slot is a last uplink slot for the PUCCH transmission that overlaps with the PDCCH or the PDSCH, or
        in case that the higher layer parameter is not configured, identifying that the slot is a last uplink slot for the PUCCH transmission that overlaps with a downlink slot for the PDCCH or the PDSCH; and
    transmitting, to the base station, the PUCCH including hybrid automatic repeat request acknowledgment (HARQ-ACK) information corresponding to the PDCCH or the PDSCH based on the slot and a feedback timing indicator.

2. The method of claim 1, wherein the PDCCH includes downlink control information (DCI) indicating a semi-persistent scheduling (SPS) PDSCH release.

3. The method of claim 1, wherein the higher layer parameter configuring the sub-slot for the PUCCH includes information of a sub-slot length for a sub-slot based PUCCH feedback,
    wherein, in case that a normal cyclic prefix (CP) is configured, the sub-slot length is indicated as 2 or 7 symbols, and
    wherein, in case that an extended CP is configured, the sub-slot length is indicated as 2 or 6 symbols.

4. The method of claim 1, further comprising receiving, from the base station, a higher layer signalling indicating a semi-static HARQ-ACK codebook.

5. A method of a base station in a wireless communication system, the method comprising:
    transmitting, to a user equipment (UE), a physical downlink control channel (PDCCH) or a physical downlink shared channel (PDSCH); and
    receiving, from the UE, a physical uplink control channel (PUCCH) transmission in an uplink slot identified based on a slot associated with the PUCCH transmission and a feedback timing indicator, wherein the PUCCH transmission includes hybrid automatic repeat request acknowledgement (HARQ-ACK) information corresponding to the PDCCH or the PDSCH,
    wherein in case that a higher layer parameter configuring a sub-slot for a PUCCH is configured to the UE, the slot is a last uplink slot for the PUCCH transmission that overlaps with the PDCCH or the PDSCH, and wherein in case that the higher layer parameter is not configured to the UE, the slot is a last uplink slot for the PUCCH transmission that overlaps with a downlink slot for the PDCCH or the PDSCH.

6. The method of claim 5, wherein the PDCCH includes downlink control information (DCI) indicating a semi-persistent scheduling (SPS) PDSCH release.

7. The method of claim 5, wherein the higher layer parameter configuring the sub-slot for the PUCCH includes information of a sub-slot length for a sub-slot based PUCCH feedback, wherein, in case that a normal cyclic prefix (CP) is configured to the UE, the sub-slot length is indicated as 2 or 7 symbols, and wherein, in case that an extended CP is configured to the UE, the sub-slot length is indicated as 2 or 6 symbols.

8. The method of claim 5, further comprising transmitting, to the UE, a higher layer signalling indicating a semi-static HARQ-ACK codebook.

9. A user equipment (UE) in a wireless communication system, the UE comprising:

a transceiver;

memory storing one or more computer programs; and one or more processors communicatively coupled to the transceiver and the memory, wherein the one or more computer programs include computer-executable instructions that, when executed by the one or more processors individually or collectively, cause the UE to:

receive, from a base station, a physical downlink control channel (PDCCH) or a physical downlink shared channel (PDSCH), identify a slot associated with a physical uplink control channel (PUCCH) transmission, transmit, to the base station, the PUCCH including hybrid automatic repeat request acknowledgment (HARQ-ACK) information corresponding to the PDCCH or the PDSCH based on the slot and a feedback timing indicator, and wherein the one or more computer programs including computer-executable instructions that, when executed by the one or more processors individually and collectively, cause the UE to:

in case that a higher layer parameter configuring a sub-slot for a PUCCH is configured, identify that the slot is a last uplink slot for the PUCCH transmission that overlaps with the PDCCH or the PDSCH or, in case that the higher layer parameter is not configured, identify that the slot is a last uplink slot for the PUCCH transmission that overlaps with a downlink slot for the PDCCH or the PDSCH.

10. The UE of claim 9, wherein the PDCCH includes downlink control information (DCI) indicating a semi-persistent scheduling (SPS) PDSCH release.

11. The UE of claim 9, wherein the higher layer parameter configuring the sub-slot for the PUCCH includes information of a sub-slot length for a sub-slot based PUCCH feedback, wherein, in case that a normal cyclic prefix (CP) is configured, the sub-slot length is indicated as 2 or 7 symbols, and wherein, in case that an extended CP is configured, the sub-slot length is indicated as 2 or 6 symbols.

12. The UE of claim 9, wherein the one or more computer programs including computer-executable instructions that, when executed by the one or more processors individually or collectively, cause the UE to receive, from the base station, a higher layer signalling indicating a semi-static HARQ-ACK codebook .

13. A base station in a wireless communication system, the base station comprising:

a transceiver;

memory storing one or more computer programs; and one or more processors communicatively coupled to the transceiver and the memory, wherein the one or more computer programs include computer-executable instructions that, when executed by the one or more processors individually or collectively, cause the base station to:

transmit, to a user equipment (UE), a physical downlink control channel (PDCCH) or a physical downlink shared channel (PDSCH); and receive, from the UE, a physical uplink control channel (PUCCH) transmission in an uplink slot identified based on a slot associated with a PUCCH transmission and a feedback timing indicator, wherein the PUCCH transmission includes hybrid automatic repeat request acknowledgement (HARQ-ACK) information corresponding to the PDCCH or the PDSCH, wherein, in case that a higher layer parameter configuring a sub-slot for a PUCCH is configured to the UE, the slot is a last uplink slot for the PUCCH transmission that overlaps with the PDCCH or the PDSCH or, in case that the higher layer parameter is not transmitted to the UE, the slot is a last uplink slot for the PUCCH transmission that overlaps with a downlink slot for the PDCCH or the PDSCH.

14. The base station of claim 13, wherein PDCCH includes downlink control information (DCI) indicating a semi-persistent scheduling (SPS) PDSCH release.

15. The base station of claim 13, wherein the higher layer parameter configuring the sub-slot for the PUCCH includes information of a sub-slot length for a sub-slot based PUCCH feedback, wherein, in case that a normal cyclic prefix (CP) is configured to the UE, the sub-slot length is indicated as 2 or 7 symbols, and wherein in case that an extended CP is configured to the UE, the sub-slot length is indicated as 2 or 6 symbols.

16. The base station of claim 13, wherein the one or more computer programs including computer-executable instructions that, when executed by the one or more processors individually or collectively, cause the base station to transmit, to the UE, a higher layer signalling indicating a semi-static HARQ-ACK codebook.

* * * * *

UNITED STATES PATENT AND TRADEMARK OFFICE
CERTIFICATE OF CORRECTION

| | |
|---|---|
| PATENT NO. | : 12,309,774 B2 |
| APPLICATION NO. | : 17/664827 |
| DATED | : May 20, 2025 |
| INVENTOR(S) | : Lee et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 372 days.

Signed and Sealed this
Sixteenth Day of December, 2025

John A. Squires
*Director of the United States Patent and Trademark Office*